US012327537B2

(12) United States Patent
Dunwoodie

(10) Patent No.: US 12,327,537 B2
(45) Date of Patent: Jun. 10, 2025

(54) FRETBOARD FOR STRINGED MUSICAL INSTRUMENT

(71) Applicant: David Dunwoodie, Delta (CA)

(72) Inventor: David Dunwoodie, Delta (CA)

( * ) Notice: Subject to any disclaimer, the term of this patent is extended or adjusted under 35 U.S.C. 154(b) by 187 days.

(21) Appl. No.: 17/897,010

(22) Filed: Aug. 26, 2022

(65) Prior Publication Data

US 2023/0070885 A1 Mar. 9, 2023

Related U.S. Application Data

(60) Provisional application No. 63/237,918, filed on Aug. 27, 2021.

(51) Int. Cl.
*G10D 3/06* (2020.01)
*G10D 1/08* (2006.01)

(52) U.S. Cl.
CPC ................ *G10D 3/06* (2013.01); *G10D 1/08* (2013.01)

(58) Field of Classification Search
CPC .................................. G10D 3/06; G10D 1/08
See application file for complete search history.

(56) References Cited

U.S. PATENT DOCUMENTS 1,472,943 A * 11/1923 Shaeffer .................. G10D 3/06 984/115
2,816,469 A * 12/1957 Gossom .................. G10D 1/05 84/293
3,481,238 A * 12/1969 Veres ....................... G10D 3/06 84/293
3,787,600 A * 1/1974 Muncy ..................... G10D 1/05 984/115
4,064,780 A * 12/1977 Bond ....................... G10D 3/06 84/307
5,760,322 A 6/1998 Ward et al.
6,069,306 A * 5/2000 Isvan ..................... G10D 1/085 84/293
7,256,336 B2 * 8/2007 Muncy ..................... G10D 3/06 84/314 N
7,728,210 B2 * 6/2010 Thidell .................... G10D 3/22 84/314 R
7,763,786 B2 * 7/2010 Jones ....................... G10D 3/06 84/314 R
8,324,489 B1 * 12/2012 Chapman ................ G10D 1/08 84/314 R (Continued)

*Primary Examiner* — Robert W Horn

(57) ABSTRACT

A fretboard for a stringed musical instrument, the musical instrument, and a method of manufacturing the fretboard. A unitary body serves as the fretboard and lies underneath a plurality of tensioned strings, extending in a longitudinal direction. The unitary body is elongated in the longitudinal direction. The unitary body includes a plurality of ridges extending transverse to the longitudinal direction and arranged in succession in the longitudinal direction to define separate frets. Each ridge is associated with a plurality of notes corresponding to the plurality of strings and is composed of a plurality of ridge segments corresponding to the plurality of strings. The plurality of ridge segments are disposed adjacent to each other and are shaped relative to each other to correct intonation of the plurality of notes. The method of manufacturing includes forming the plurality of ridges in unitary construction with the unitary body.

16 Claims, 7 Drawing Sheets

(56) References Cited

U.S. PATENT DOCUMENTS

| | | | | |
|---|---|---|---|---|
| 10,311,839 | B1 * | 6/2019 | Soberg | G10D 1/08 |
| 10,643,584 | B1 * | 5/2020 | Kudirka | G10D 3/06 |
| 2019/0189091 | A1 * | 6/2019 | Soberg | G10D 1/08 |
| 2023/0070885 | A1 * | 3/2023 | Dunwoodie | G10D 3/06 |

* cited by examiner

FRETBOARD FOR STRINGED MUSICAL INSTRUMENT

TECHNICAL FIELD

The disclosure relates generally to fretted stringed instruments, and more particularly to frets and fretboards thereof.

BACKGROUND

Plucking a string held taut between two far ends on a stringed instrument generates sounds based on the frequency of vibration of the strings. The frequency of vibration depends, inter alia, on the length, thickness, and material of the string. By depressing strings against frets positioned between the two far ends, a musician may vary the characteristics of the string—chiefly, the freely vibrating length—to thereby change the frequency of vibration and achieve a broader range of notes.

Frets are pronounced features providing a musician, simultaneously, a guide to where to press down (or pinch) the string to generate a desired note and a raised surface against which to press down the string. They are usually disposed on the necks of stringed instruments and need not only to be positioned accurately for achieving the desired string characteristics, but also must be formed in a manner appropriate for pressing against, in order to effectively engage with the string for proper intonation.

It is frequently found that frets are provided in the form of parallel features distributed along the neck of the instrument. An objective here may be to use the frets to subdivide the notes generated by each string. Such parallel frets may be formed of metal to provide a hard surface and musically appropriate surface against which to press strings. Instruments may be made of wood and so such metal frets may be joined to a wood backing or substrate. In some cases, a fretboard comprises a wooden plank with a plurality of parallel metal inserts distributed across its length (for convenience, referred to herein as two-piece frets or two-piece fretboards).

In practice, such an arrangement may not necessarily achieve the desired intonation in all cases. For example, musicians may be prone to pull the string sideways, which may appreciably change the frequency of vibration of the string (e.g., by changing a length). In some cases, the flexural rigidity of one or more strings may not be negligible. Nevertheless, parallel frets formed in the manner mentioned above is ubiquitous in the field of necked, stringed musical instruments.

U.S. Pat. No. 6,069,306 to Isvan et al. discloses stringed musical instruments having a plurality of frets spaced along the neck of the instrument, wherein the spacing of the frets from a nut of the instrument is determined based on a string stiffness parameter. The resulting frets have a spacing, for a given fret, that varies from fret to fret. Curved and/or angled curves are proposed that compensate for stiffness of the string. The stiffness is proposed to arise due to beam-like behaviour of the string, which is then combined with its known cable-like behaviour. The string tension, instead of spacing (only), is modulated to compensate for other undesirable effects on intonation. In particular, compensating string tension is proposed to overcome postulated additional string length arising due to non-negligible vertical spacing of the fret away from the string. The vertical spacing leads to an "action height".

U.S. Pat. No. 7,728,210 B2 to Thidell et al. discloses a device for string instruments comprising a fretboard with a plurality of frets formed by milling slots and pressing thereinto relatively soft material that functions as the fret. Segments of the fret are displaced lengthwise along tensioned strings of the instrument for tone correction. The frets are continuously formed from individual segments that are spaced away from each other, to form at least some overall non-straight frets.

U.S. Pat. No. 5,760,322 to Ward et al. discloses a fingerboard for a guitar having frets that deviate at specific fret/string intersections for the purpose of improving the tuning accuracy of the instrument. Such deviations "flatten" the notes produced at the intersections. The deviations lead to at least some non-straight frets.

SUMMARY

Improving intonation of stringed fretted instruments is important. Flexibility in the location of frets is desirable to achieve preferred intonation. Non-standard frets may be more difficult and costly to manufacture, especially when the fret shapes are more complex. In some cases, particularly when fret shapes are complex, multi-part frets may suffer from reliability and quality issues. For example, in a two-piece slot-fret configuration, the matching of complex slot shapes to complex fret shapes may be time laborious and consuming.

High-quality and robust complex frets, i.e., frets that are not straight or parallel, that have well-defined locations for pressing may be formed from a single piece of material in a cost-effective and reliable manner via ridges defined by asymmetrically tapering portions. The ridges provide a well-defined edge for pressing the strings. Asymmetrical tapering allows efficient machining, additive manufacturing, or casting, to form the frets and fretboard in unitary construction. For example, a slowly receding rearward portion of the fret may be achieved cost-effectively by milling of wood, metal or plastic material. Fewer parts may provide a longer life and relatively lower rate of equipment failure. The aforementioned ridges also provide an opportunity for the designer to control the depth to which the string is depressed when a string is fretted, or in other words, control the apparent 'action' without changing the string height. When the ridges are made with a deep concavity the 'action' of the string appears higher to the player (the distance between the string and the lowest point that it can be pressed by the player is increased), when the concavity is small or non-existent, the string action appears lower to the player. In this way the fretboard can be optimized to produce an overall playing experience that could not be achieved by simply using a flat surface between the frets.

In one aspect, the disclosure describes a fretted stringed musical instrument, comprising: two strings extending along the instrument and defining a string plane; and a fret defined by an asymmetrically tapered ridge extending between the two strings, a projection of the fret in the string plane deviating from a straight line between the two strings, the straight line being perpendicular to at least one of the two strings.

In some aspects, the present invention provides a fretted, stringed musical instrument, comprising: a plurality of strings that extend in a longitudinal direction and are tensioned; and a fretboard underneath the plurality of strings comprising an elongate unitary body having a plurality of ridges extending transverse to the longitudinal direction and arranged in succession in the longitudinal direction to define separate frets, each ridge associated with a plurality of notes corresponding to the plurality of strings and being composed of a plurality of ridge segments, each ridge segment corresponding to a string of the plurality of strings, the plurality of ridge segments disposed adjacent to each other and each ridge segment being shaped relative to adjacent ridge segments to provide a desired intonation of a corresponding string as said string is depressed onto said ridge segment and plucked, to improve musicality of the instrument.

In some embodiments of the musical instrument, each ridge of the plurality of ridges extends curvedly and continuously under the plurality of strings.

In some embodiments of the musical instrument, each ridge of the plurality of ridges curves in the longitudinal direction to vary a plurality of frequencies associated with depression of the plurality of strings on to the ridge.

In some embodiments of the musical instrument, a first ridge segment of a ridge is shaped to extend away from a second ridge segment in the longitudinal direction to correct a frequency associated with a string extending above the first ridge segment to match a predetermined frequency.

In some embodiments of the musical instrument, a ridge segment of the plurality of ridge segments is shaped based on a first parameter and a second parameter, the first parameter being indicative of stiffness of a string extending above the ridge segment, and the second parameter being indicative of mass moment of inertia of the string.

In some embodiments of the musical instrument, a ridge segment of the plurality of ridge segments lying underneath a string of the plurality of strings is shaped to compensate for an anticipated change in tension of the string from a resting position of the string to a depressed position of the string to improve musicality.

In some embodiments of the musical instrument, a first ridge segment of the plurality of ridge segments is raised above a second ridge segment of the plurality of ridge segments to vary a first action height associated with the first ridge segment relative to a second action height associated with the second ridge segment.

In some embodiments, the musical instrument further comprises a bridge, wherein the unitary body abruptly descends away from each ridge of the plurality of ridges in the longitudinal direction towards the bridge so as to mitigate depression of each string of the plurality of strings against corresponding portions of the unitary body adjacent to the plurality of ridges and extending from the plurality of ridges towards the bridge, during use of the musical instrument.

In some embodiments, the musical instrument further comprises a bridge, wherein the unitary body tapers asymmetrically about each ridge of the plurality of ridges to prevent depression of a string of the plurality of strings on to the unitary body between the bridge and the ridge while allowing depression of the string on to the unitary body adjacent to the ridge away from the bridge, when the string is depressed against the ridge.

In some aspects, the present invention provides a fretboard adapted to be fitted to a neck of a stringed musical instrument having a plurality of strings extending in a longitudinal direction and that are tensioned, the fretboard comprising a unitary body elongated in the longitudinal direction and being mountable on the musical instrument underneath the plurality of strings, the unitary body including, a plurality of ridges extending transverse to the longitudinal direction and arranged in succession in the longitudinal direction to define separate frets, each ridge associated with a plurality of notes corresponding to the plurality of strings and being composed of a plurality of ridge segments, each ridge segment corresponding to a string of the plurality of strings, the plurality of ridge segments disposed adjacent to each other and each ridge segment being shaped relative to adjacent ridge segments to provide a desired intonation of a corresponding string as said string is depressed onto said ridge segment and plucked to improve musicality of the instrument.

In some embodiments of the fretboard, each ridge of the plurality of ridges extends curvedly and continuously in the longitudinal direction to vary a plurality of frequencies associated with depression of the plurality of strings on to the ridge.

In some embodiments of the fretboard, a first ridge segment of a ridge is shaped to extend away from a second ridge segment in the longitudinal direction to correct a frequency associated with a string extending above the first ridge segment to match a predetermined frequency.

In some embodiments of the fretboard, a ridge segment of the plurality of ridge segments is shaped based on a first parameter and a second parameter, the first parameter being indicative of stiffness of a string extending above the ridge segment, and the second parameter being indicative of mass moment of inertia of the string.

In some embodiments of the fretboard, a first ridge segment of the plurality of ridge segments is raised above a second ridge segment of the plurality of ridge segments to vary a first action height associated with the first ridge segment relative to a second action height associated with the second ridge segment.

In some embodiments of the fretboard, the unitary body abruptly descends away from each ridge of the plurality of ridges in the longitudinal direction towards a bridge of the musical instrument so as to mitigate depression of each string of the plurality of strings against corresponding portions of the unitary body adjacent to the plurality of ridges and extending from the plurality of ridges towards the bridge, during use of the musical instrument.

In some embodiments of the fretboard, the unitary body tapers asymmetrically about each ridge of the plurality of ridges to prevent depression of a string of the plurality of strings on to the unitary body between a bridge of the musical instrument and the ridge while allowing depression of the string on to the unitary body adjacent to the ridge away from the bridge, when the string is depressed against the ridge.

In some aspects, the present invention provides a fretted, stringed musical instrument, comprising: a plurality of strings that extend in a longitudinal direction and are tensioned; and a unitary body elongated in the longitudinal direction and extending, underneath the plurality of strings, transverse to the longitudinal direction, to serve as a fretboard, the unitary body including a plurality of ridges extending transverse to the longitudinal direction and arranged in succession in the longitudinal direction to define separate frets, each ridge associated with a plurality of notes corresponding to the plurality of strings and being composed of a plurality of ridge segments corresponding to the plurality of strings, the plurality of ridge segments disposed adjacent to each other and shaped relative to each other to correct intonation of the plurality of notes to improve musicality of the instrument.

In some aspects, the present invention provides a fretboard adapted to be fitted to a neck of a stringed musical instrument, the musical instrument having a plurality of strings that are tensioned, the fretboard comprising: a unitary body elongated in a longitudinal direction and extending transverse thereto such that the unitary body is engageable with the musical instrument underneath the plurality of strings, the unitary body including a plurality of ridges extending transverse to the longitudinal direction and arranged in succession in the longitudinal direction to define separate frets, each ridge associated with a plurality of notes corresponding to the plurality of strings and composed of a plurality of ridge segments corresponding to the plurality of strings, the plurality of ridge segments disposed adjacent to each other and shaped relative to each other to correct intonation of the plurality of notes to improve musicality.

In some aspects, the present invention provides a fretboard for a fretted stringed musical instrument, the fretboard comprising: at least two non-parallel frets, each of the at least two non-parallel frets defined by a corresponding asymmetrically tapering ridge.

Embodiments can include combinations of the above features.

In some aspects, the present invention provides a method of manufacturing a fretboard for a stringed musical instrument having a plurality of strings that are tensioned, comprising: forming a plurality of ridges in unitary construction with a unitary body, the plurality of ridges extending transverse to a longitudinal direction of the unitary body and arranged in succession in the longitudinal direction to define separate frets, each ridge associated with a plurality of notes corresponding to the plurality of strings and composed of a plurality of ridge segments corresponding to the plurality of strings, the plurality of ridge segments disposed adjacent to each other and shaped relative to each other to correct intonation of the plurality of notes to improve musicality, the unitary body elongated in the longitudinal direction and extending transverse thereto such that the unitary body is engageable with the musical instrument underneath the plurality of strings.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure relates to fretted stringed musical instruments. In some embodiments, the devices and methods disclosed herein can facilitate cost effective and high-quality manufacturing of fretboards adapted for accurate or more desirable intonation.

Aspects of various embodiments are described in relation to the figures.

Figure 1:
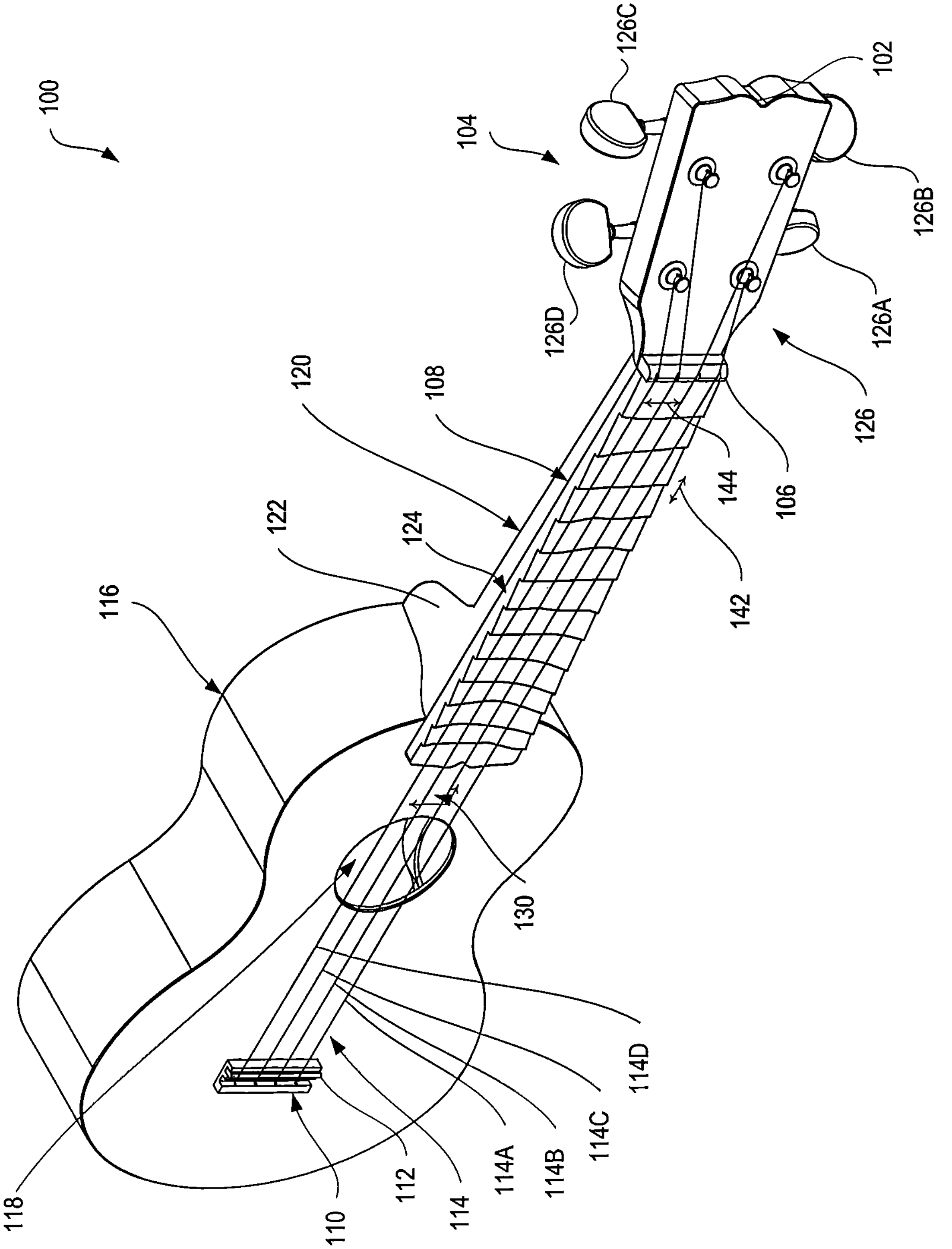
FIG. 1 is an exemplary fretted stringed musical instrument.

FIG. 1 is an exemplary fretted stringed musical instrument 100 (referred to hereinafter as instrument 100). In various embodiments, the instrument 100 may be an acoustic instrument or electric instrument. For illustrative purposes, an acoustic ukulele is described and illustrated herein but it is conceived that aspects disclosed herein may be applied to other acoustic or electric stringed musical instruments, such as guitars, banjos, mandolins, and the like.

The instrument 100 may include, in generally sequentially order in a top-to-bottom direction 142 of the instrument (for the purposes herein), a headstock 104 including a head 102 at a top end thereof, a neck 120, and a body 116.

A nut 106 may be disposed between the head 102 and the neck 120. The neck 120 may form a heel 122 abutting the body 116.

A fretboard 108 (or fingerboard) may extend across the neck 120 in the top-to-bottom direction 142 from the nut 106 to, and/or at least partially over, the body 116. The fretboard 108 may extend transverse across the neck 120 in the top-to-bottom direction 142.

A bridge 110, comprising a saddle 112, may be disposed below the fretboard 108 in the top-to-bottom direction 142. A sound hole 118 may be disposed between the bridge 110 and the fretboard 108. In electric instruments, electric pickups would be situated in the approximate location of the sound hole 118 in place thereof.

A plurality of strings 114 extend from the headstock 104 across the neck 120 towards and to the bridge 110 such that the strings 114 extend at least partially over the body 116. In the illustrated embodiment, the plurality of strings 114 include a string 114A, a string 114B, a string 114C, and a string 114D. In some embodiments, such as in guitar embodiments, four, six, eight or twelve strings may be provided. In some embodiments, five or more strings may be provided. In some embodiments, between one and four strings may be provided.

The plurality of strings 114 are attached to the headstock 104 using a corresponding plurality of tuning machines 126. The string 114A, the string 114B, the string 114C, the string 114C may be attached, respectively, to the tuning machine 126A, the tuning machine 126B, the tuning machine 126C, and the tuning machine 126D. The plurality of tuning machines 126 may be a plurality of capstans.

The plurality of strings 114 are bent over or pinched between the nut 106 and the saddle 112. The plurality of strings 114 may be fixed at the plurality of tuning machines 126 and the bridge 110. The displacement and velocity of the plurality of strings 114 may be zero or close to zero at the nut 106 and the bridge 110. The length of string left free therebetween at least partially determines the frequency of vibration, which may be relevant for sound generation.

The plurality of strings 114 extend above a plurality of frets 124 formed in the fretboard 108 and over the sound hole 118. Any two strings of the plurality of strings 114 extending along the instrument 100 may define a corresponding string plane, e.g. a string plane 130. In some embodiments, all strings of the plurality of strings 114 substantially define a single plane.

The tension in the plurality of strings 114 may be varied using a corresponding plurality of tuning keys 128. The tension in the strings 114A, the string 114B, the string 114C, the string 114C may be varied, respectively, using the tuning key 128A, the tuning key 128B, the tuning key 128C and the tuning key 128D.

The instrument 100 may be operated by setting the plurality of strings 114 in vibratory motion over the sound hole 118. An operator may do so by plucking one or more of the plurality of strings 114 over the sound hole 118 to establish vibration of the string between its two pinched ends, e.g. between the bridge 110 and the nut 106.

In some embodiments, the string 114A may be configured to generate the highest pitch sound and/or may be the thinnest string. In some embodiments, the string 114D may configured to generate the lowest pitch sound and/or may be the thickest string. In some embodiments, the string 114A, the string 114B, the string 114C, the string 114D may be configured for notes A, E, C, and G, respectively.

The plurality of strings 114 may be tuned by varying string tension using the plurality of tuning machines 126.

The plurality of frets 124 are pronounced features at locations where an operator may press down on one or more of the plurality of strings 114 to change the free portion thereof and change the pitch of sound generated when the respective one or more strings are plucked. For example, the plurality of frets 124 may include 13 frets. A free portion on a string may lie between a general position of depression of the string against a fret of the plurality of frets 124 and the bridge 110.

Fret features may generally be used to generate notes, e.g. by subdividing an octave. Thus, a fret closer to the sound hole 118 may be used to generate a shorter length of a string (of the plurality of string 114), which shortens the wavelength generated by the string. For example, in this manner, instruments may be made to produce a particular set of frequencies (or notes) by varying the positions of a set of frets along the length of the string.

As referred to herein, straight, or linear frets are those frets that extend substantially in a straight line between two extremal points across one or more strings of the plurality of strings 114. For example, linear frets may linearly extend under two or more adjacent strings of the plurality of strings 114. As referred to herein, parallel frets comprise two or more straight frets that lie in substantially non-intersecting parallel lines. Non-linear and non-parallel frets may be defined relative to linear and parallel frets, respectively. Note that in some cases, non-parallel frets may include two or more frets each having the same non-straight fret shape (displaced from one another).

In some embodiments, reference to "frets" may include continuous frets, i.e. frets that extend continuously under at least two adjacent strings. In some embodiments, continuous frets may extend under substantially all the strings.

It is found that straight and/or parallel frets may not generate a desired sound and/or note. For example, the location where a string should be depressed to optimally produce a desired note may vary depending on which of the plurality of strings 114 is being depressed and in which location along the length of the string in the direction 142.

The string may not behave purely as a cable in tension. For example, the string may have stiffness associated therewith and thus may behave at least partially as a beam in flexure as discussed in U.S. Pat. No. 6,069,306 Isvan. Hence, in some embodiments, the use of the equations from said patent may be a possible way to define the string parameters, such that the frequency of a string may be modelled as a combination of a cable frequency $f_c$ and a beam frequency $f_b$. The cable frequency $f_c$ may be obtained by modelling the string as a pure cable while the beam frequency $f_b$ may be obtained by modelling the string as a pure beam. For example, an overall string frequency may be approximated as a root-mean-square frequency, $f_0=\sqrt{f_b^2+f_c^2}$.

In some embodiments, the cable frequency $$f_c = \frac{1}{2L_n}\sqrt{\frac{T}{d}}.$$

In some embodiments, the beam frequency $$f_b = \frac{X^2}{2\pi L_n^2}\sqrt{\frac{EI}{d}}.$$

Here, for a string having a length $L_n$ of a free portion defined by the n-th fret, D is the linear density (mass per unit length) of the string, T is the string tension, E is the Young's modulus of the string material, X is a coefficient depending on boundary conditions, and I is the second moment of inertia (mass moment of inertia) of the string's cross-section (e.g. for a circular cross-section of diameter D, $I=\pi D^4/64$).

A desired frequency $f_0$ of a string may be achieved by solving the equation of $f_0$ shown above (after substituting an appropriate equation for the two separate frequencies) for the length $L_n$. Establishing a feature (fret) at such a length of the string to facilitate pinching the string thereon may allow generation of a fundamental frequency $f_0$ between the feature and the bridge 110.

Since the cross-section of strings among the plurality of strings 114 may vary, the length $L_n$ will in general vary from string to string in a way that may be difficult to compensate using tension T alone. Moreover, the variation between strings may depend on the frequency of interest. For example, the relationship between the length $L_n$ associated with the n-th fret and the frequency of the m-th mode of a string fretted at the n-th fret may be given by $$f_{m,n} = \frac{1}{2L_n}\sqrt{\frac{T}{d}m^2 + \frac{E(X_m D)^4}{64\pi d L_n^2}}$$

Such a relationship may be solved (or inverted) to yield $$\frac{1}{L_n^2} = \frac{-b+\sqrt{b^2+af_{m,n}^2}}{2a}$$

where $$a = \frac{(X_m D)^4 E}{256\pi d}$$

is a function of the string material, cross-section, and boundary conditions, and $$b = \frac{m^2 T}{4d}$$

is a function of the string tension.

For example, in some embodiments, maintaining an equal-tempered scale may lead to non-parallel frets.

In some cases, depressing a string against a fret may change the length of the string due to a height of the fret ("action height"). This change in length may adversely affect the intonation. In some embodiments, such effects may be compensated for by varying the string length and/or the tension.

In some cases, an operator may depress a string towards a fret with one or more fingers (or other device) and may cause an unintentional side-ways displacement of the string, leading to an unintended change in intonation. In some embodiments, frets may be displaced lengthwise along the strings to compensate for this unwanted change in intonation (for correction thereof).

Further changes to fret positions may be made depending on other factors in order to achieve desired intonation.

In various embodiments, tone correction and desired intonation may be achieved via two or more non-parallel frets and/or a single fret with a projection in a string plane that is non-perpendicular to at least one of the strings. The string plane may be defined by two or more strings associated with the fret, e.g., two or more strings under which the fret passes and which the fret is configured to operate with.

One or more of the plurality of frets 124 may be advantageously manufactured by forming asymmetrically tapering ridges in the fretboard 108. The one or more frets may extend continuously, in a generally transverse direction 144, over two or more of the plurality of strings 114 to form continuous frets. Such frets may be manufactured additively or by removing material in a unitary piece to bypass difficulties in assembling complex shapes associated with non-linear and/or non-parallel frets. A string may be fretted by pressing down on the ridge. A resulting intonation may be clearer and a resulting fretting easier. Unitary construction may reduce cost and rattling.

Figure 2A:
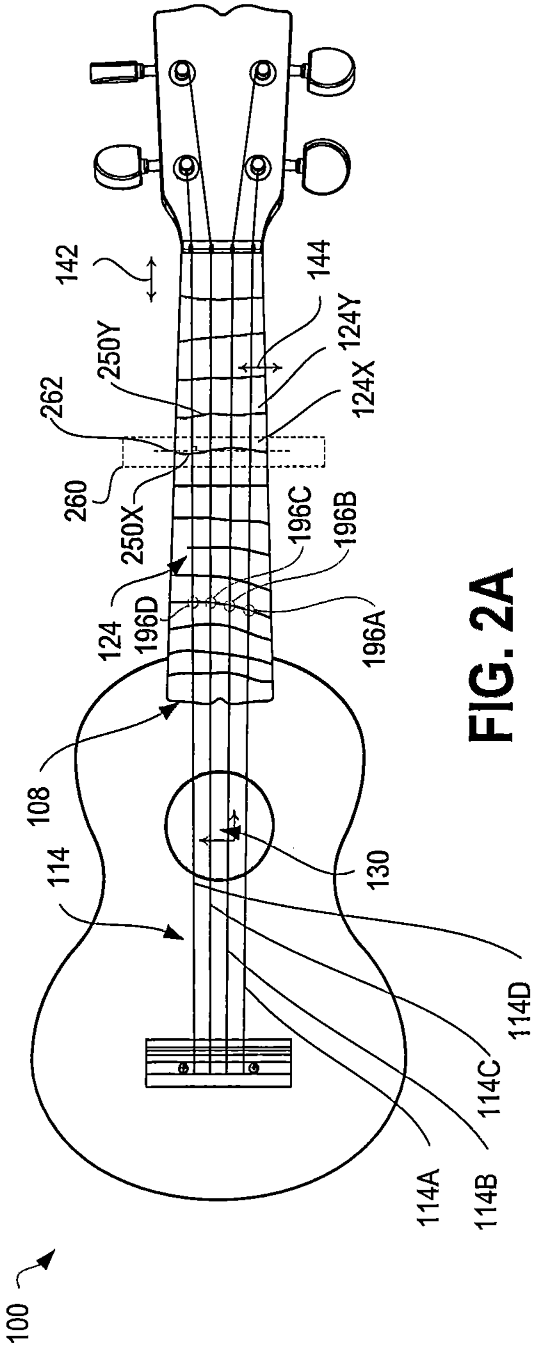
FIG. 2A is a top plan view of the instrument.

FIG. 2A is a top plan view of the instrument 100.

Figure 2B:
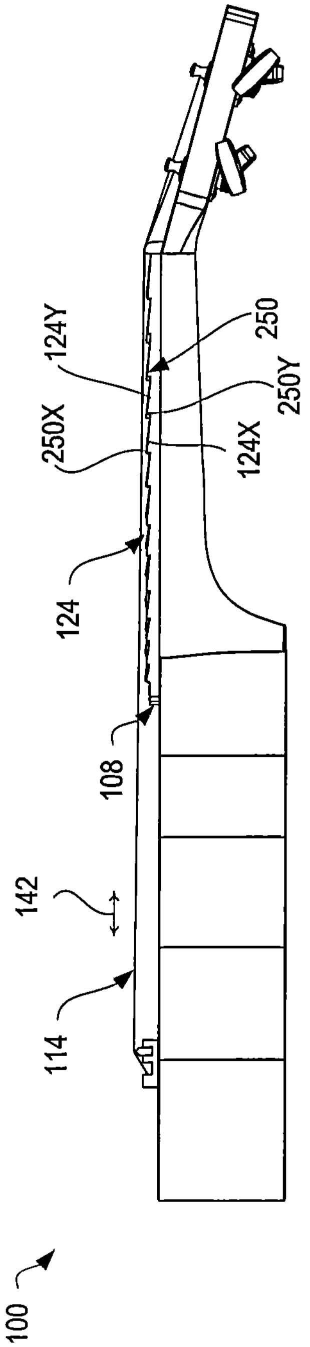
FIG. 2B is a side elevation view of the instrument.

FIG. 2B is a side elevation view of the instrument 100.

For clarity, instrument parts described in FIG. 1, other than the fretboard 108 and associated parts, are not labelled in FIGS. 2A-2B.

FIG. 2A shows a projection of the plurality of frets 124 in the string plane 130.

The plurality of frets 124 may be defined by a plurality of ridges 250 extending generally transversely and continuously between the plurality of strings 114. The plurality of ridges 250 may be asymmetrically tapered in generally the top-to-bottom direction 142. "Tapering" as referred to herein may refer, in context, refer to tapering defining a corresponding ridge. In some embodiments, "tapering" may include an abrupt change (e.g. a minimally tapered condition). For example, a fret 124X may be defined by an asymmetrically tapered ridge 250X extending between the string 114A and the string 114D. The ridge 250X may provide a relatively sharp or narrow feature to depress the string against and generate a well-defined intonation via the sound hole 118.

In various embodiments, a projection 260 of the fret 124X in the string plane 130 deviates from a straight line 260 between the two strings (the string 114A and the string 114D) that is perpendicular to at least one of the two strings (here at least the string 114D).

In various embodiments, at least two of the plurality of frets 124 (ridges thereof) are non-parallel frets, e.g., fret 124X and fret 124Y. Each of the at least two non-parallel frets may be defined by a corresponding asymmetrically tapering ridge, e.g. ridge 250X and ridge 250Y, respectively.

Each of the plurality of strings 114 may be associated with a fret position on a fret against which a corresponding string is depressed for intonation. For example, on the same example fret, the string 114A may be associated with the fret position 196A, the string 114B with the fret position 196B, the string 114C with the fret position 196C, and the string 114D with the fret position 196D.

Figure 3A:
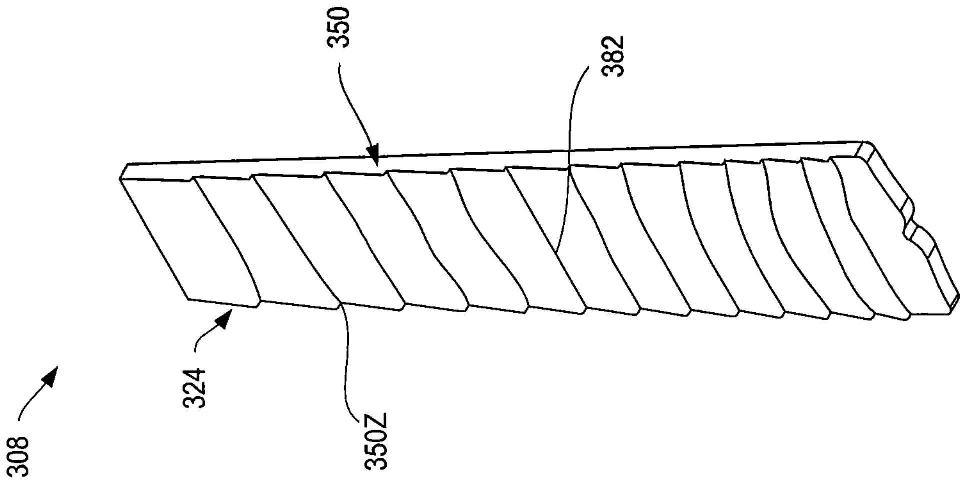
FIG. 3A is a perspective view of a fretboard, in accordance with an embodiment.

FIG. 3A is a perspective view of a fretboard 308, in accordance with an embodiment.

Figure 3B:
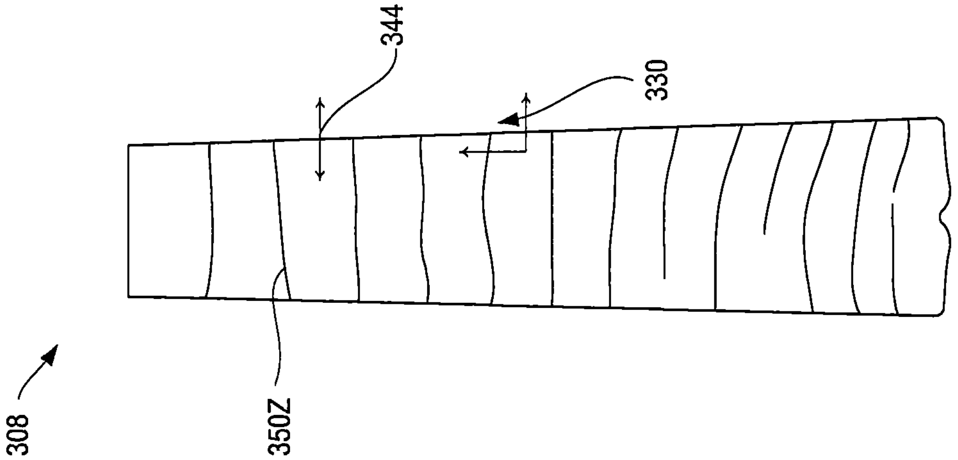
FIG. 3B is a plan view of the fretboard of FIG. 3A.

FIG. 3B is a plan view of the fretboard of FIG. 3A.

Figure 3C:
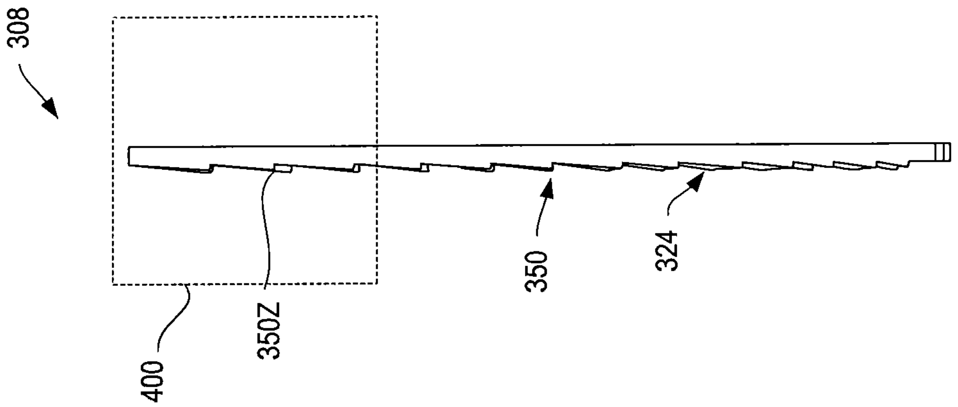
FIG. 3C is a side elevation view of the fretboard of FIG. 3A.

FIG. 3C is a side elevation view of the fretboard of FIG. 3A.

The fretboard 308 may be adapted to be installed on ukulele, guitar, banjo, or other necked stringed instrument. In some embodiments, the fretboard 308 may be used to replace an existing fretboard on a music instrument. The fretboard 308 is preferably of unitary construction such as for example the fretboard 308 may be manufactured by machining (milling) a wood, metal or plastic piece, by additive manufacturing techniques, by casting of metal, or more preferably by injection molding of a thermoplastic.

The fretboard 308 may include a plurality of frets 324 having a corresponding plurality of ridges 350.

At least one fret of the plurality of frets 324 may be a linear fret, and which may also have a projection in a string plane 330 that is configured to be normal to at least one string of the plurality of strings 114. For example, FIG. 3B may show the projection of the plurality of frets 324 in such a plane (at least notionally, since strings are not shown in FIG. 3B). The transverse direction 344 may be generally lateral to one or more strings of the plurality of strings 114.

In some embodiments, the nut 106 may be used to reference distances for the remaining frets. The primary consideration is that each string is intonated accordingly, whether one fret is straight or not is less important. It should be noted that no frets, including the nut and saddle (defined analogously as the zeroth and the last fret respectively), need be straight, although most people would make the nut strait out of convenience.

In some embodiments, one or more frets of the plurality of frets 324 may transversely extend only partially or halfway across the fretboard 308. In some embodiments, all the frets of the plurality of frets 324 extend transversely across the fretboard 308.

Figure 4:
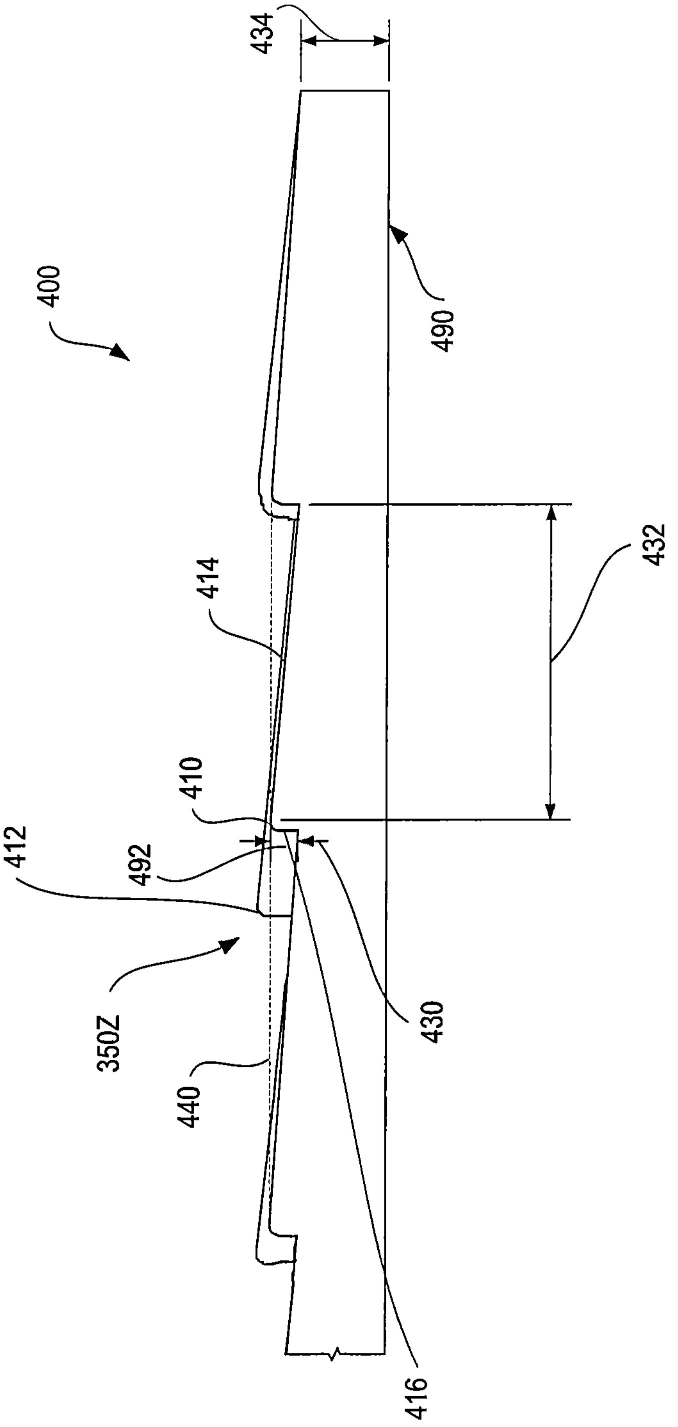
FIG. 4 is an enlarged view of area 400 in FIG. 3C.
Figure 5:
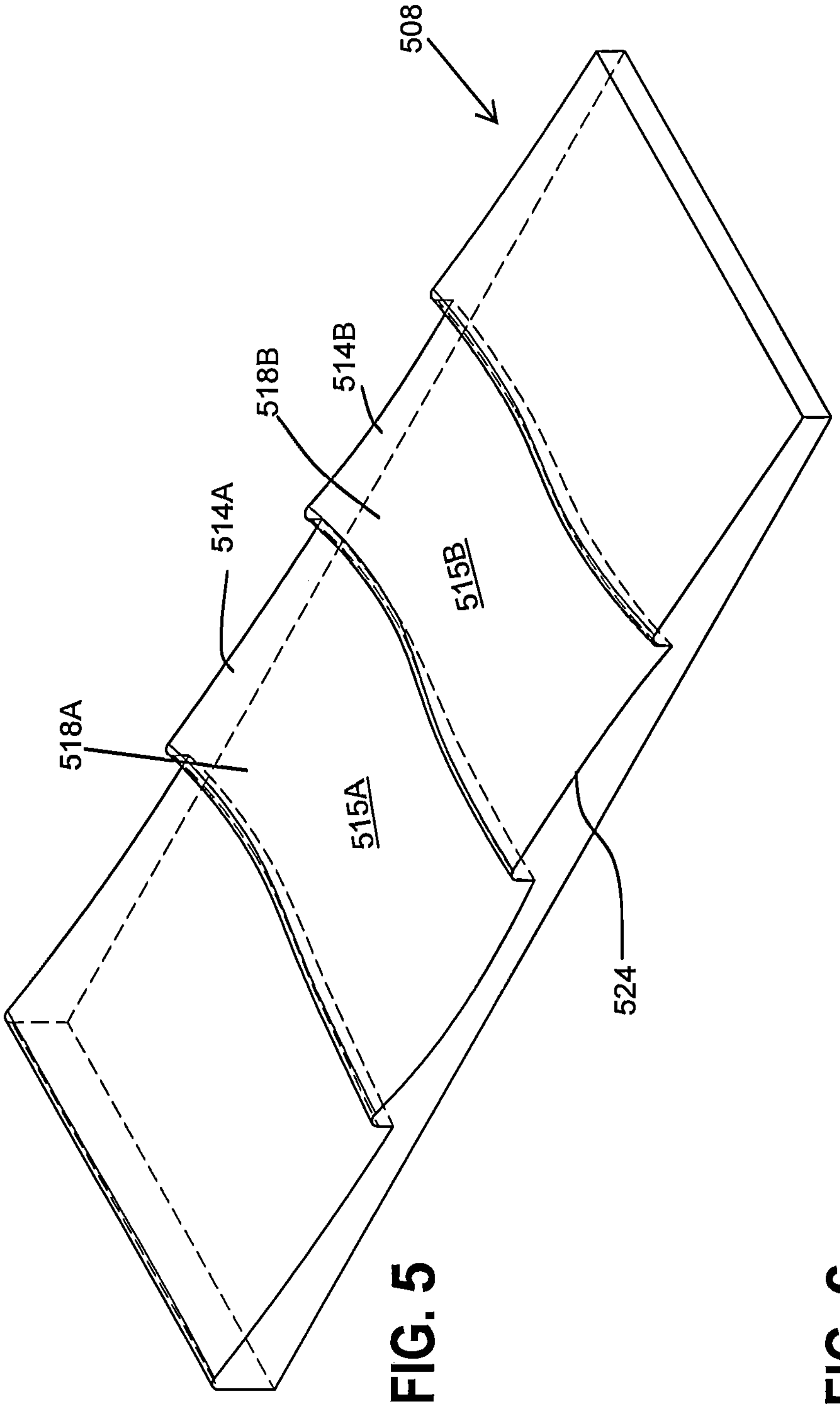
FIG. 5 is a perspective view of a portion of another embodiment of a fretboard in accordance with the present invention.
Figure 6:
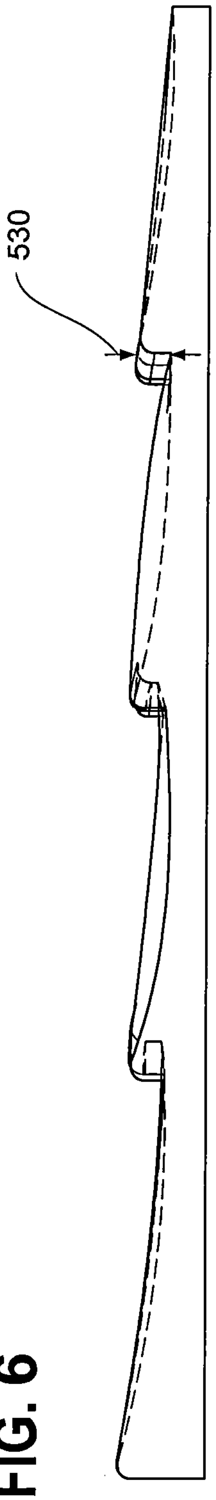
FIG. 6 is a side view of the portion of the fretboard in FIG. 5.
Figure 7:
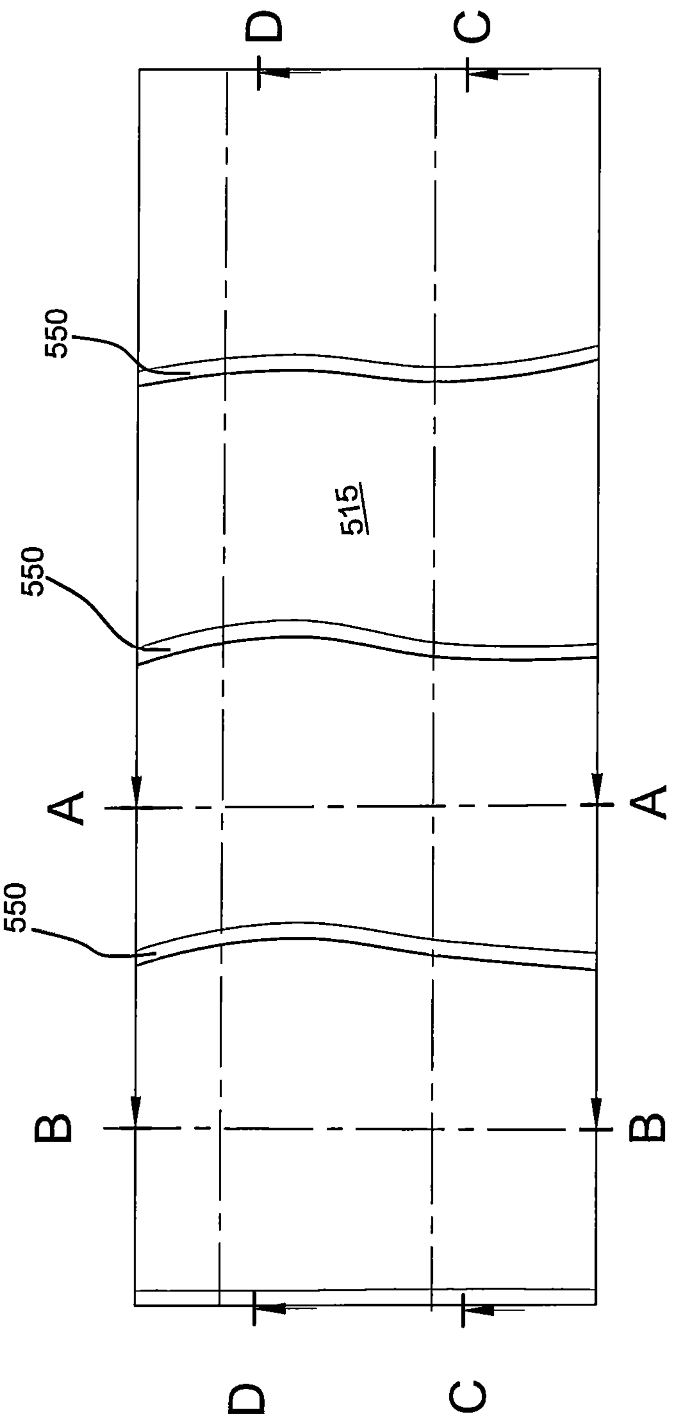
FIG. 7 is a top view of the portion of the fretboard in FIG. 5.
Figure 9:
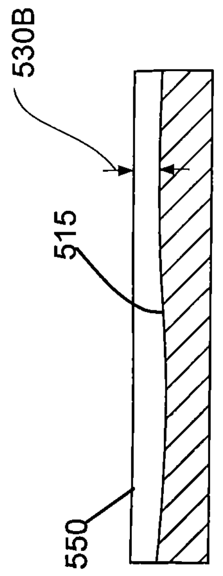
FIG. 9 is a section view along line B-B of the portion of the fretboard in FIG. 7.
Figure 8:
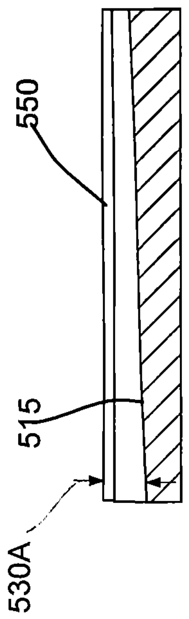
FIG. 8 is a section view along line A-A of the portion of the fretboard in FIG. 7.
Figure 10:
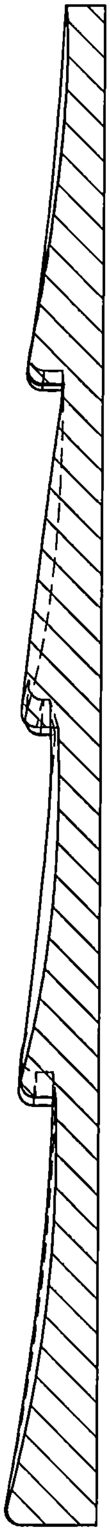
FIG. 10 is a longitudinal section view along line C-C of the portion of the fretboard in FIG. 7.
Figure 11:
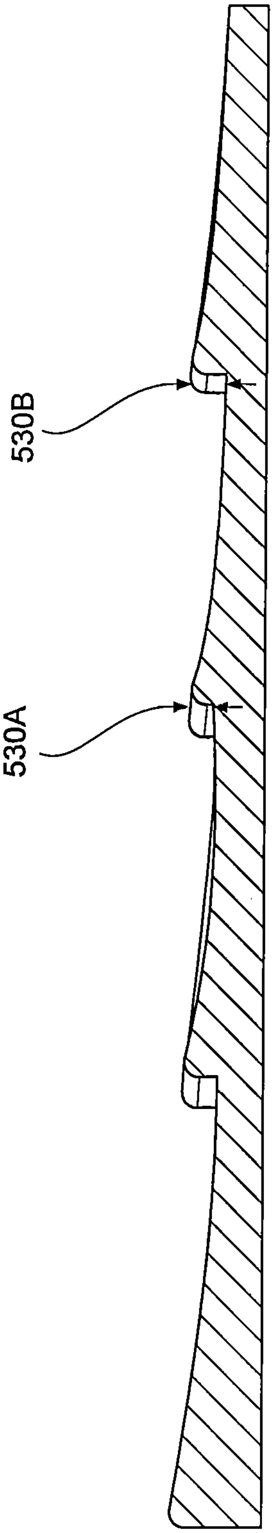
FIG. 11 is a longitudinal section view along line D-D of the portion of the fretboard in FIG. 7.

FIG. 4 is an enlarged view of area 400 in FIG. 3C.

The enlarged view shows a few of the plurality of ridges 350, including a ridge 350Z. The ridge 350Z may be illustrative, e.g., one or more of the other ridges of the plurality of ridges 350 may be configured similarly, even though they may be dissimilarly shaped (varying dimensions).

Two or more of the plurality of ridges 350, or portions thereof, may lie on a common level line 440.

In some embodiments the common level line 440 may be horizontal and/or parallel to one or more of the plurality of strings 114.

The ridge 350Z may extend from an end 410 to opposed end 412. The end 410 and opposed end 412 may be displaced relative to each other along a length of the fretboard 308 (a length in a direction generally running from one fret to the next fret). Such displacement may vary from fret to fret, and may lead to non-parallel frets, e.g., 350Z may have one or more non-parallel frets adjacent thereto. The ridge 350Z may (nonlinearly) vary in shape transversely between the end 410 and the opposed end 412.

The ridge 350Z is defined between a rear portion 414 and a front portion 416. The rear portion 414 and front portion 416 may define opposing tapers (respectively) which then intersect in the position of the ridge 350Z. In various embodiments, the rear portion 414 (and/or additionally the front portion 416) may be integral with or in unitary construction with the fretboard 308. The front portion 416 may be integral with or in unitary construction with the rear portion 414.

The front portion 416 may be substantially straight and may have an abrupt taper, i.e., the taper may descend rapidly over a small distance in the form of a cliff. The front portion 416 may thereby define a depression 492 (a transverse depression) in the fretboard 308. The depression 492 may define a fret height 430. The depression 492 may gradually recede towards an adjacent fret.

The rear portion 414 may define a gradual slope in the rear of the ridge 350Z, and similarly fret. In some embodiments, the rear portion 414 may be sloping by tapering to a plane 490 of the fretboard 308. The plane 490 may be a plane of a face of the fretboard 308 approximately aligned with and/or distal from the plurality of strings 114 relative to the plurality of frets 324.

In various embodiments, the rear portion 414 recedes from the top edge of a fret until it approaches an adjacent fret. A length of the rear portion 432 may be adapted to extend between adjacent ridges of the plurality of ridges 350. For example, the rear portion 414 may recede from the ridge 350Z towards an adjacent fret. Sloping of the rear portion 414 may be at least partially oriented towards the plane 490 of the fretboard 308. The slope of the line 410 along 432 approaches the plane 490.

The plurality of frets 324 may not have sharp edges where fingers are to be depressed against strings. Nevertheless, in some embodiments, ridges may be sharper relative to two-piece frets to achieve more accurate intonation and/or to suppress string 'buzzing' or the like. Strings may be made stationery and rattling may be prevented by increasing pressure of the fingers on the strings.

A thickness 434 of the fretboard may be substantially greater than the fret height 430 and may be adapted to achieve a desired structural stiffness and strength.

Referring to FIGS. 5-11 there is shown a portion of another embodiment of a fretboard 508 in accordance with the present invention that is similar to the embodiment shown in FIG. 4 but having surfaces 515 of the rear portions 514 of the frets 524 that are contoured and that may vary in shape from other or adjacent surfaces 515 of the other frets 524. Hence, surface 515A on the rear portion 514A may have a different surface contour from that of surface 515B of the adjacent rear portion 515B. The contour of the surfaces 515 may extend to the ridges 550 of one or more frets 524 such that, for example, a ridge 550 may define a varying fret height profile 530A along its length, which fret height profile 530A may vary from the fret height profile 530B of another of the ridges 550. For example, surface 515A may have a slight concave portion 518A whereas surface 515B may have a more pronounced concave portion 518B. These are examples only and the contours of the surfaces 515 may vary in size, location, shape, and depth. The contours of each surface 515 may be localized to the strings 114 situated above the contour and the shape of the contour under a string 114 is preferably of a shape that produces an optimal musical tone resulting from the fretting of a string 114 above the contour and playing the string so fretted.

As a result of contours of each surface 515, each fretting section, where the string is pressed down, can have a different profile. For example, each profile may be unique, as illustrated in FIGS. 6-11. These profiles correspond to string locations and are used to control how far the string is pressed down at that location, controlling the action at those points and thereby limiting how much the user distorts the frequency of that note by pressing down. The profile of the fretboard under each note may be defined by the designer to control the action which leads to the correct note being played. Hence no adjacent fretting surfaces need be at the same height with respect to the string plane.

In various embodiments, determining fret positions and/or shapes of frets may be based on string stiffness, tension, sideways movement, and/or other parameters. In some embodiments, such a determining may include using a predetermined formula incorporating a string stiffness parameter. In some embodiments, such determining may be made by determine the correct fret spacing for each string using any number of methods. Then for each fret number, from 0 to 13, 14 (for example) one may connect the fret locations of each string with a splined curve which defines the front edge of raised asymmetrically tapering ridge. For some embodiments the nut would be straight and perpendicular to the center line of the fretboard. The first fret would then slope towards the nut location (with some linear or polynomial function of distance along the fretboard), its vertical displacement (vertical defined as perpendicular to the plane of the fretboard) equal to the fret height 430 when it reaches the nut. Following the first fret the process would continue whereby frets N would taper towards frets N−1 to meet up with the defined spline of fret N−1 offsetting vertically 430 from raised fret N−1.

As can be understood, the examples described above and illustrated are intended to be exemplary only.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the frets may have varying heights and may adapted for a fretted instrument other than a guitar or a ukulele. Yet further modifications could be implemented by a person of ordinary skill in the art in view of the present disclosure, which modifications would be within the scope of the present technology.

What is claimed is:

1. A fretted, stringed musical instrument, comprising:

a plurality of strings that extend in a longitudinal direction and are tensioned; and a fretboard underneath the plurality of strings comprising an elongate unitary body having unitarily constructed thereon a plurality of ridges extending transverse to the longitudinal direction and arranged in succession in the longitudinal direction to define separate frets, each ridge associated with a plurality of notes corresponding to the plurality of strings and being composed of a plurality of ridge segments, each ridge segment corresponding to a string of the plurality of strings, the plurality of ridge segments disposed adjacent to each other and each ridge segment being shaped relative to adjacent ridge segments to provide a desired intonation of a corresponding string as said string is depressed onto said ridge segment and plucked, to improve musicality of the instrument, wherein a first ridge segment of a ridge of the plurality of ridges is shaped to extend away from a second ridge segment of the ridge in the longitudinal direction to correct a frequency associated with a string extending above the first ridge segment to match a predetermined frequency.

2. The musical instrument of claim 1, wherein each ridge of the plurality of ridges extends curvedly and continuously under the plurality of strings.

3. The musical instrument of claim 2, wherein each ridge of the plurality of ridges curves in the longitudinal direction to vary a plurality of frequencies associated with depression of the plurality of strings on to the ridge.

4. The musical instrument of claim 1, wherein a first ridge segment of a ridge is shaped to extend away from a second ridge segment in the longitudinal direction to correct a frequency associated with a string extending above the first ridge segment to match a predetermined frequency.

5. The musical instrument of claim 1, wherein a ridge segment of the plurality of ridge segments is shaped based on a first parameter and a second parameter, the first parameter being indicative of stiffness of a string extending above the ridge segment, and the second parameter being indicative of mass moment of inertia of the string.

6. The musical instrument of claim 1, wherein a ridge segment of the plurality of ridge segments lying underneath a string of the plurality of strings is shaped to compensate for an anticipated change in tension of the string from a resting position of the string to a depressed position of the string to improve musicality.

7. The musical instrument of claim 1, wherein a first ridge segment of the plurality of ridge segments is raised above a second ridge segment of the plurality of ridge segments to vary a first action height associated with the first ridge segment relative to a second action height associated with the second ridge segment.

8. The musical instrument of claim 1, further comprising a bridge, wherein the unitary body abruptly descends away from each ridge of the plurality of ridges in the longitudinal direction towards the bridge so as to mitigate depression of each string of the plurality of strings against corresponding portions of the unitary body adjacent to the plurality of ridges and extending from the plurality of ridges towards the bridge, during use of the musical instrument.

9. The musical instrument of claim 1, further comprising a bridge, wherein the unitary body tapers asymmetrically about each ridge of the plurality of ridges to prevent depression of a string of the plurality of strings on to the unitary body between the bridge and the ridge while allowing depression of the string on to the unitary body adjacent to the ridge away from the bridge, when the string is depressed against the ridge.

10. A fretboard adapted to be fitted to a neck of a stringed musical instrument having a plurality of strings extending in a longitudinal direction and that are tensioned, the fretboard comprising a unitary body elongated in the longitudinal direction and being mountable on the musical instrument underneath the plurality of strings, the unitary body including constructed unitarily thereon a plurality of ridges extending transverse to the longitudinal direction and arranged in succession in the longitudinal direction to define separate frets, each ridge associated with a plurality of notes corresponding to the plurality of strings, each ridge being composed of a plurality of ridge segments, each ridge segment corresponding to a string of the plurality of strings, the plurality of ridge segments disposed adjacent to each other and each ridge segment being shaped relative to adjacent ridge segments to provide a desired intonation of a corresponding string as said string is depressed onto said ridge segment and plucked to improve musicality of the instrument, wherein a first ridge segment of a ridge of the plurality of ridges is shaped to extend away from a second ridge segment of the ridge in the longitudinal direction to correct a frequency associated with a string extending above the first ridge segment to match a predetermined frequency.

11. The fretboard of claim 10, wherein each ridge of the plurality of ridges extends curvedly and continuously in the longitudinal direction to vary a plurality of frequencies associated with depression of the plurality of strings on to the ridge.

12. The fretboard of claim 10, wherein a first ridge segment of a ridge is shaped to extend away from a second ridge segment in the longitudinal direction to correct a frequency associated with a string extending above the first ridge segment to match a predetermined frequency.

13. The fretboard of claim 10, wherein a ridge segment of the plurality of ridge segments is shaped based on a first parameter and a second parameter, the first parameter being indicative of stiffness of a string extending above the ridge segment, and the second parameter being indicative of mass moment of inertia of the string.

14. The fretboard of claim 10, wherein a first ridge segment of the plurality of ridge segments is raised above a second ridge segment of the plurality of ridge segments to vary a first action height associated with the first ridge segment relative to a second action height associated with the second ridge segment.

15. The fretboard of claim 10, wherein the unitary body abruptly descends away from each ridge of the plurality of ridges in the longitudinal direction towards a bridge of the musical instrument so as to mitigate depression of each string of the plurality of strings against corresponding portions of the unitary body adjacent to the plurality of ridges and extending from the plurality of ridges towards the bridge, during use of the musical instrument.

16. The fretboard of claim 10, wherein the unitary body tapers asymmetrically about each ridge of the plurality of ridges to prevent depression of a string of the plurality of strings on to the unitary body between a bridge of the musical instrument and the ridge while allowing depression of the string on to the unitary body adjacent to the ridge away from the bridge, when the string is depressed against the ridge.

* * * * *